United States Patent
Aronsson

(10) Patent No.: US 7,726,463 B2
(45) Date of Patent: Jun. 1, 2010

(54) UNIT FOR GROUPING PACKAGES ALONG A PATH

(75) Inventor: Niclas Aronsson, Alingsås (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 279 days.

(21) Appl. No.: 11/883,543

(22) PCT Filed: Feb. 3, 2006

(86) PCT No.: PCT/EP2006/050644

§ 371 (c)(1),
(2), (4) Date: Aug. 2, 2007

(87) PCT Pub. No.: WO2006/082230

PCT Pub. Date: Aug. 10, 2006

(65) Prior Publication Data

US 2008/0283360 A1 Nov. 20, 2008

(30) Foreign Application Priority Data

Feb. 4, 2005 (EP) ................................. 05100796

(51) Int. Cl.
*B65G 47/26* (2006.01)
(52) U.S. Cl. .................................. 198/419.3; 198/419.2
(58) Field of Classification Search .............. 198/418.2, 198/418.4, 419.2, 419.3, 443, 740
See application file for complete search history.

(56) References Cited

U.S. PATENT DOCUMENTS

| | | | |
|---|---|---|---|
| 3,194,382 A | 7/1965 | Nigrelli et al. | |
| 3,872,647 A | 3/1975 | Langen et al. | |
| 4,627,220 A * | 12/1986 | Lynch | 53/414 |
| 4,637,509 A * | 1/1987 | Raudat et al. | 198/419.3 |
| 5,097,939 A | 3/1992 | Shanklin et al. | |
| 5,147,027 A | 9/1992 | Cruver | |
| 5,551,550 A * | 9/1996 | Marshall et al. | 198/432 |
| 5,667,055 A | 9/1997 | Gambetti | |
| 6,360,871 B1 | 3/2002 | Meyer et al. | |

(Continued)

FOREIGN PATENT DOCUMENTS

EP    0 703 167 B1    3/1996

(Continued)

*Primary Examiner*—Douglas A Hess
(74) *Attorney, Agent, or Firm*—Buchanan Ingersoll & Rooney PC

(57) ABSTRACT

A unit for grouping packages along a transfer path includes an input station receiving the packages arranged in longitudinal lines parallel to the transfer path; an output station for groups defined by a given number of packages from respective longitudinal lines and aligned in at least one line crosswise to the transfer path; a movable conveying surface, which is fed at predetermined time intervals with a number of packages equal to that of each group, and feeds the packages along the transfer path; and at least one movable member, which is fed cyclically along an operating path having at least one portion parallel to the transfer path, and has an aligning surface, against which, at each cycle, the packages in each group upstream from the movable member come to rest and are aligned in at least one line crosswise to the transfer path; the movable member also has a push surface which, at each cycle, acts on each group of packages downstream from the movable member to push the group out of the unit.

19 Claims, 3 Drawing Sheets

U.S. PATENT DOCUMENTS

| | | | |
|---|---|---|---|
| 6,688,456 B2 * | 2/2004 | Jones et al. | 198/415 |
| 6,763,929 B2 * | 7/2004 | Malini | 198/419.3 |
| 6,766,628 B2 * | 7/2004 | Guidetti | 53/443 |
| 6,793,064 B2 | 9/2004 | Schoeneck et al. | |
| 6,843,360 B2 * | 1/2005 | Peterman et al. | 198/429 |
| 7,222,716 B2 * | 5/2007 | Peterman et al. | 198/419.3 |
| 7,481,309 B2 * | 1/2009 | Wagner et al. | 198/419.3 |

FOREIGN PATENT DOCUMENTS

| | | |
|---|---|---|
| FR | 2 768 416 A1 | 3/1999 |
| JP | 1-162621 A | 6/1989 |

* cited by examiner

UNIT FOR GROUPING PACKAGES ALONG A PATH

TECHNICAL FIELD

The present invention relates to a unit for grouping packages along a transfer path.

In the following description and Claims, the term "package" is used in its widest sense to indicate any container for packaging liquid or pourable food products, and therefore includes, not only packets made of multilayer sheet material and similar, to which reference is made hereinafter purely by way of example, but also glass or plastic bottles, tins, etc.

BACKGROUND ART

As is known, many pourable food products, such as fruit juice, UHT (ultra-high-temperature treated) milk, wine, tomato sauce, etc., are sold in packages made of sterilized sheet packaging material.

A typical example of this type of package is the parallelepiped-shaped package for liquid or pourable food products known as Tetra Brik Aseptic (registered trademark), which is made by folding and sealing laminated strip packaging material. The packaging material has a multilayer structure comprising a layer of fibrous material, e.g. paper, covered on both sides with layers of heat-seal plastic material, e.g. polyethylene. In the case of aseptic packages for long-storage products, such as UHT milk, the packaging material comprises a layer of oxygen-barrier material, e.g. aluminium foil, which is superimposed on a layer of heat-seal plastic material, and is in turn covered with another layer of heat-seal plastic material eventually forming the inner face of the package contacting the food product.

As is known, packages of this sort are produced on fully automatic packaging lines, on which a continuous tube is formed from the web-fed packaging material; the web of packaging material is sterilized, e.g. by applying a chemical sterilizing agent such as a hydrogen peroxide solution, which is subsequently removed from the surfaces of the packaging material, e.g. evaporated by heating; and the web of packaging material so sterilized is maintained in a closed, sterile environment, and is folded and sealed longitudinally to form a vertical tube.

The tube is filled with the sterilized or sterile-processed food product, and is sealed and subsequently cut along equally spaced cross sections to form pillow packs, which are folded mechanically to form respective finished, e.g. substantially parallelepiped-shaped, packages.

Alternatively, the packaging material may be cut into blanks, which are formed into packages on forming spindles, and the packages are filled with the food product and sealed. One example of this type of package is the so-called "gable-top" package known by the trade name Tetra Rex (registered trademark).

In both the above cases, the finished packages are fed successively to a grouping unit, where they are formed into separate groups of a given number, which are eventually packed in packing material, e.g. cardboard or plastic film, to form respective packs for transport to retailers.

More specifically, the packages are fed to the grouping unit in lines parallel to the travelling direction, and are temporarily accumulated at a receiving station; a predetermined number of packages at the receiving station are then fed onto a conveyor for transfer to an output station. Along the path defined by the conveyor, the packages in each group are aligned into one or more lines crosswise to the travelling direction, and are then pushed to the output station, where they are packed in packing material to form a relative pack.

One example of a known grouping unit, suitable for grouping plastic bottles, is illustrated in U.S. Pat. No. 6,793,064.

More specifically, the above unit substantially comprises a continuous belt conveyor having a straight flat conveying branch, onto which the bottles are fed, at predetermined time intervals and in groups of a predetermined number, for transfer to a downstream packing station, where each group of bottles so formed in packed for delivery to retailers.

As they are fed to the packing station, the bottles in each group are first aligned into a specific configuration, and are then pushed, in that configuration, into the packing station. This is done by means of two separate mechanisms—an aligning mechanism and a push mechanism—arranged in succession in the travelling direction of the bottles.

The aligning mechanism is located over the conveyor, and comprises a number of aligning bars extending crosswise to the travelling direction of the bottles, and which are fed by a chain drive device along an endless path having a portion facing and parallel to the conveying branch of the conveyor.

Each group of bottles fed onto the conveyor comes to rest against a relative downstream aligning bar travelling slower than the conveyor.

The aligning bars therefore provide for slowing the bottles down slightly with respect to the speed of the conveyor, so as to compact the bottles in the travelling direction and align them into one or more lines crosswise to the travelling direction. The aligning bars also prevent the bottles from toppling over on the conveyor.

The push mechanism is located over the conveyor and downstream from the aligning mechanism in the travelling direction of the bottles, and, like the aligning mechanism, comprises a number of push bars extending crosswise to the travelling direction of the bottles, and which are fed by a further chain drive device along an endless path having a portion facing and parallel to the conveying branch of the conveyor.

Where the aligning bars release the relative groups of bottles, each push bar interacts with the upstream side of the bottles in each group to push the group to the packing station at the same speed as the conveyor.

Known units of the type described above have a relatively large number of moving parts, which means complex setting and timing procedures and relatively high maintenance costs, and are also of considerable bulk.

DISCLOSURE OF INVENTION

It is an object of the present invention to provide a package grouping unit designed to provide a straightforward, low-cost solution to the aforementioned drawbacks typically associated with known units.

According to the present invention, there is provided a unit for grouping packages along a transfer path, as claimed in claim 1.

BRIEF DESCRIPTION OF THE DRAWINGS

A preferred, non-limiting embodiment of the present invention will be described by way of example with reference to the accompanying drawings, in which.

BEST MODE CARRYING OUT THE INVENTION

Figure 1:
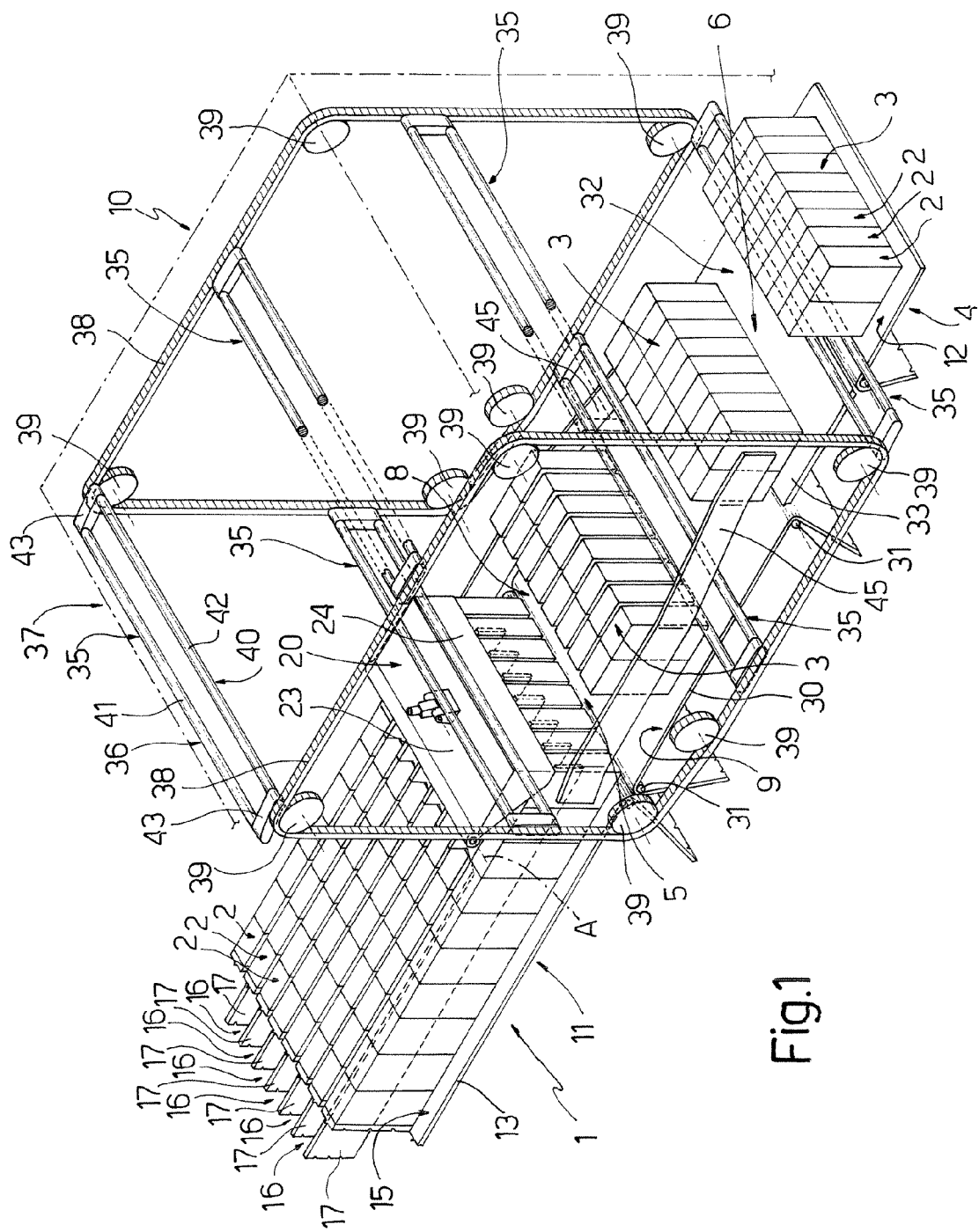
FIG. 1 shows a view in perspective, with parts removed for clarity, of a package grouping unit in accordance with the teachings of the present invention.

Number 1 in the accompanying drawings indicates as a whole a unit in accordance with the present invention for grouping packages 2 along a transfer path T—in the example shown, a straight transfer path. More specifically, unit 1 provides for separating packages 2 into groups 3, of a predetermined number and configuration, for supply to a packing unit 4 (shown only partly) where groups 3 are packed in packing material (not shown), e.g. cardboard or plastic film, to form relative packs for transport to retailers.

In the example shown, packages 2 are defined by parallelepiped-shaped packets made, as described previously in detail, of multilayer sheet packaging material, which is filled with a pourable food product, such as pasteurized or UHT milk, fruit juice, wine, etc., and sealed.

Alternatively, packages 2 may be defined by a number of packets held together by packing material, e.g. plastic film, or may be defined by other types of packaging containers, such as bottles, tins, etc.

Unit 1 substantially comprises an input station 5 for receiving packages 2 arranged in longitudinal lines parallel to path T; an output station 6 for groups 3 comprising a given number of packages 2 from respective longitudinal lines and aligned in one or more lines crosswise to path T; a conveyor 8 defining a moving conveying surface 9 fed at predetermined intervals with a number of packages 2 equal to that of each group 3, and which feeds packages 2 from input station 5 to output station 6 along path T; and an aligning device 10, which interacts with packages 2 on conveyor 8 to align them into one or more lines crosswise to path T as they travel towards output station 6.

More specifically, packages 2 are fed to input station 5 by a step-operated belt conveyor 11, and, once formed into separate groups 3, are fed from output station 6 onto a further belt conveyor 12 forming part of packing unit 4 and shown only partly in the accompanying drawings.

More specifically, conveyor 11 comprises a belt 13 looped about a number of rollers 14—at least one of which is powered—and defining, for packages 2, a flat horizontal top conveying surface 15 coplanar with and upstream from conveying surface 9 of conveyor 8. More specifically, as they travel on conveyor 11, packages 2 are kept in longitudinal lines parallel to path T by a number of fixed channels 16 forms on top of conveying surface 15. Each channel 16 is bounded by two lateral guide walls 17, between which a relative longitudinal line of packages 2, resting on conveying surface 15, is fed.

In known manner, conveyor 11 is driven by a servomotor (not shown) for time intervals of a length depending on the number of packages 2 to be fed, at each drive step of conveyor 11, to input station 5 to form a relative group 3. That is, for each drive step of conveyor 11, a given number of packages 2 are transferred from a downstream portion of conveying surface 15 of conveyor 11 to input station 5 of unit 1, defined by an upstream portion of conveying surface 9 of conveyor 8. Each drive step is followed by a pause, in which packages 2 are accumulated on said downstream portion of conveying surface 15.

The number of packages 2 fed to conveyor 8 is controlled in known manner by sensors, e.g. optical sensors, not shown in the drawings, by not being essential to a clear understanding of the present invention.

Preferably, a retaining member 20, activated synchronously with the pauses of conveyor 11, is provided to hold back the queue of packages 2 waiting to be fed to input station 5.

Figure 2:
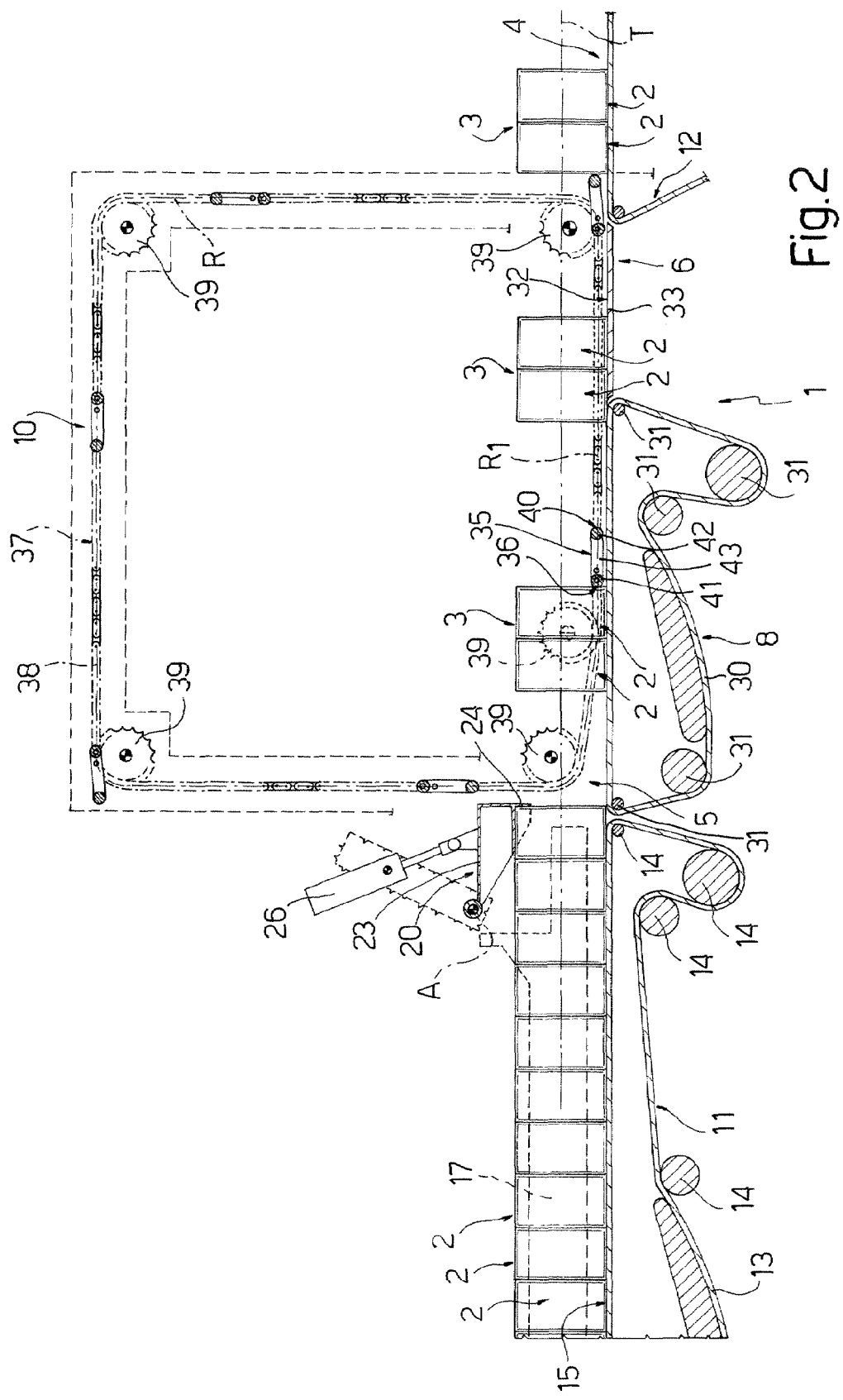
FIGS. 2 and 3 show side views of the FIG. 1 unit in two different operating conditions interacting with the packages.
Figure 3:
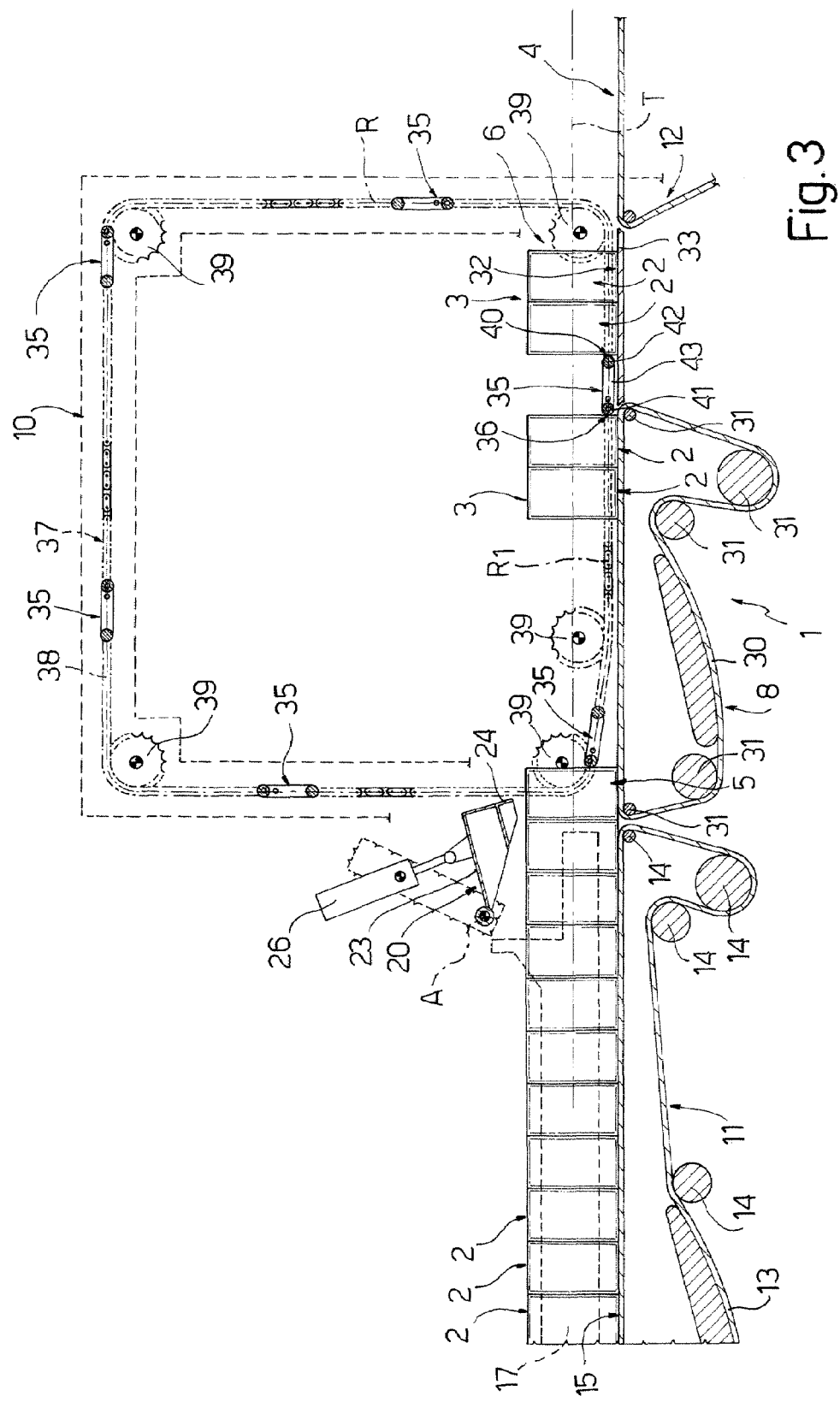

More specifically, retaining member 20 is defined by a plate, which, viewed from the side, is in the form of an inverted L, and rotates about a fixed axis A, perpendicular to the travelling direction of packages 2, between a raised release position (FIG. 3), in which it disengages packages 2 to allow free access to conveyor 8, and a lowered retaining position (FIGS. 1 and 2), in which it cooperates with the top and front of the transverse line of packages 2 immediately upstream from input station 5 to prevent it moving towards conveyor 8.

More specifically, with reference to the travelling direction of packages 2, retaining member 20 is hinged about axis A by an upstream end edge, and comprises a first portion 23 bounded on one side by said end edge, and which is positioned facing and parallel to conveying surface 15 of conveyor 11 to cooperate with a top wall of packages 2; and a second portion 24 extending perpendicularly from an end edge, opposite axis A, of portion 23, and which cooperates with the top portion of respective front walls of packages 2 adjacent to input station 5. Retaining member 20 is moved between the release and retaining positions by a known actuator 26 not described in detail.

Packages 2 in each group 3 are aligned while on conveyor 8, which is preferably a belt conveyor and is driven continuously at constant or variable speed by a known servomotor (not shown).

Conveyor 8 substantially comprises a belt 30 looped about a number of rollers 31—at least one of which is connected to the servomotor—and defining top conveying surface 9 for packages 2.

Output station 6 is advantageously defined by a decelerating surface 32 coplanar with and downstream from conveying surface 9, and which slows down groups 3 of packages 2 prior to transfer to packing unit 4.

Decelerating surface 32 is preferably defined by a fixed horizontal surface 33 interposed between conveyors 8 and 12.

Alternatively, decelerating surface 32 may be defined by a movable surface moving slower than conveying surface 9, or only the surface 9.

Aligning device 10 comprises one or more bar members 35, which extend perpendicularly to the travelling direction of packages 2, move cyclically along a path R having a portion $R_1$ parallel to path T from input station 5 to output station 6, and each define an aligning surface 36 against which, at each cycle, the packages 2 of a relative upstream group 3 come to rest and are aligned in one or more lines crosswise to path T.

In the example shown, bar members 35 are six in number and are fitted, equally spaced, to a chain conveyor 37 located over conveying surface 9 of conveyor 8 and over decelerating surface 32.

More specifically, conveyor 37 comprises two identical endless chains 38 extending on opposite sides of conveying surfaces 9 of conveyor 8 and decelerating surface 32, and supporting bar members 35 in between.

Each chain 38 is looped about a relative number of rollers 39 to assume a roughly rectangular configuration, with two sides parallel to conveying surface 9 of conveyor 8 and to decelerating surface 32, and two sides perpendicular to surfaces 9, 32.

Chains 38 are driven continuously at constant or variable speed by a known servomotor (not shown), and define the path R of bar members 35, which, in the example shown, is a rectangular path with one side parallel to path T.

At least when interacting with packages 2, each bar member 35 is advanced by chains 38 slower than, or at most at the same speed as, conveying surface 9.

Advantageously, each bar member 35 also comprises, downstream, a push surface 40 which, at each cycle, acts on each group 3 of packages 2 downstream from bar member 35 to push group 3 from unit 1 to packing unit 4.

In other words, each bar member 35 provides, at each cycle, for aligning a relative group 3 of upstream packages 2, while the group 3 is on conveying surface 9 of conveyor 8, and also for pushing a relative group 3 of downstream packages 2 being decelerated on surface 32.

Each bar member 35 comprises two cylindrical bars 41, 42 joined at corresponding opposite ends by respective connecting portions 43 integral with respective chains 38; the upstream bar (41), with reference to the travelling direction of packages 2 along path T, defines aligning surface 36; and the other bar (42) defines push surface 40.

As shown in FIG. 1, packages 2 travelling along conveying surface 9 of conveyor 8 are retained laterally by two fixed side members 45, which converge towards output station 6 to compact packages 2 perpendicularly to path T.

Operation of unit 1 will be described with reference to the formation of one group 3 of packages 2, and as of an initial condition (FIG. 2), in which conveyor 11 is stationary, the packages 2 eventually forming said group are accumulated on the downstream portion of conveying surface 15 of conveyor 11, and retaining member 20 is in the lowered retaining position, in which it cooperates with the transverse line of packages 2 adjacent to input station 5.

When conveyor 11 is activated, retaining member 20 is rotated into the raised release position (FIG. 3) to allow a given number of packages 2 to be fed onto conveyor 8.

The packages 2 transferred from conveyor 11 to conveyor 8 come to rest against aligning surface 36 of bar 41 of a relative bar member 35 travelling through input station 5.

Once the predetermined number of packages 2 is fed off conveyor 11, this is arrested and retaining member 20 is rotated back into the lowered retaining position (FIG. 2) to hold back the queue of packages 2 accumulated on conveying surface 15.

The group 3 of packages 2 fed onto conveyor 8, on the other hand, proceeds along path T to output station 6; in the course of which, since conveyor 37 travels slower than or at the same speed as conveyor 8, packages 2 are held grouped together against relative bar member 35 and, in the specific example shown, are aligned in two lines crosswise to path T.

On reaching fixed surface 33, packages 2 are first slowed down and eventually stopped. That is, at the output of conveyor 8, packages 2 slide to a halt on fixed surface 33; and, as the packages are slowed down, the preceding bar member 35 is detached from packages 2 and continues along path R.

As group 3 travels along path T, the component packages 2 are compacted perpendicularly to path T by the guide action of side members 45.

The adjacent bar member 35, upstream from the group 3 of packages 2 arrested on fixed surface 33, catches up with said packages, releases the upstream group 3 of packages 2, and pushes the downstream packages 2 out of unit 1 onto conveyor 12 of packing unit 4.

The advantages of unit 1 according to the present invention will be clear from the foregoing description.

In particular, each bar member 35 provides for aligning and compacting the upstream packages 2, as well as for pushing the downstream packages 2 out of unit 1, thus enabling a big reduction in the total number of moving parts to be synchronized, as well as in maintenance costs and the overall size of unit 1.

That is, as opposed to separate conveyors for conveying aligning members and push members, as illustrated, for example, in U.S. Pat. No. 6,793,064, one conveyor can be used for conveying members (35) designed to both align and push packages 2 in each group 3.

Clearly, changes may be made to unit 1 as described and illustrated herein without, however, departing from the scope defined in the accompanying Claims.

The invention claimed is:

1. A unit for grouping packages along a transfer path, said unit comprising:
   an input station receiving said packages arranged in longitudinal lines parallel to said transfer path;
   an output station for groups comprising a given number of packages from respective said longitudinal lines and aligned in at least one line crosswise to said transfer path;
   a movable conveying surface, which is fed at predetermined time intervals with a number of packages equal to that of each group, and feeds said packages from said input station to said output station along said transfer path;
   at least one movable member, which is fed cyclically along an operating path having at least one portion parallel to said transfer path from said input station to said output station, and comprises an aligning surface, against which, at each cycle, the packages in each group upstream from the movable member come to rest and are aligned in at least one line crosswise to the transfer path;
   wherein said movable member also comprises a push surface which, at each cycle, acts on each group of packages downstream from the movable member to push said group out of said units;
   decelerating means, which act on said packages in each group along an end portion of said transfer path to slow down the packages prior to the pushing action of said movable member; and
   wherein said conveying surface and said movable member are moved continuously along the respective said paths.

2. A unit as claimed in claim 1, wherein said decelerating means comprise a fixed surface extending along said transfer path downstream from said conveying surface.

3. A unit as claimed in claim 2, wherein said conveying surface and said movable member are moved continuously along the respective said paths.

4. A unit as claimed in claim 3, wherein said movable member, at least when interacting with said packages, is moved at a speed at most equal to that of said conveying surface.

5. A unit as claimed in claim 1, wherein said conveying surface and said movable member are moved continuously along the respective said paths.

6. A unit as claimed in claim 5, wherein said movable member, at least when interacting with said packages, is moved at a speed at most equal to that of said conveying surface.

7. A unit as claimed in claim 1, wherein said movable member comprises two parallel bars crosswise to said transfer path; one of which, located upstream, defines said aligning surface, and the other of which defines said push surface.

8. A unit as claimed in claim 1, comprising a number of said movable members moved along said operating path, so that the aligning surface of each acts on a relative upstream group of packages, and the push surface of each acts on a relative downstream group of packages.

9. A unit as claimed in claim 1, comprising two guide side members located on opposite sides of said transfer path and converging towards said output station to compact said packages in each group crosswise to the transfer path.

10. A unit as claimed in claim 1, wherein said movable member, at least when interacting with said packages, is moved at a speed at most equal to that of said conveying surface.

11. A unit as claimed in claim 1, wherein said movable member comprises two parallel bars crosswise to said transfer path; one of which, located upstream, defines said aligning surface, and the other of which defines said push surface.

12. A unit as claimed in claim 1, comprising a number of said movable members moved along said operating path, so that the aligning surface of each acts on a relative upstream group of packages, and the push surface of each acts on a relative downstream group of packages.

13. A unit as claimed in claim 1, comprising two guide side members located on opposite sides of said transfer path and converging towards said output station to compact said packages in each group crosswise to the transfer path.

14. A unit for grouping packages along a transfer path, said unit comprising:
   an input station receiving said packages arranged in longitudinal lines parallel to said transfer path;
   an output station for groups comprising a given number of packages from respective said longitudinal lines and aligned in at least one line crosswise to said transfer path;
   a movable conveying surface, which is fed at predetermined time intervals with a number of packages equal to that of each group, and feeds said packages from said input station to said output station along said transfer path;
   at least one movable member, which is fed cyclically along an operating path having at least one portion parallel to said transfer path from said input station to said output station, and comprises an aligning surface, against which, at each cycle, the packages in each group upstream from the movable member come to rest and are aligned in at least one line crosswise to the transfer path;
   wherein said movable member also comprises a push surface which, at each cycle, acts on each group of packages downstream from the movable member to push said group out of said unit; and
   said movable member comprising two parallel bars crosswise to said transfer path; one of which, located upstream, defines said aligning surface, and the other of which defines said push surface.

15. A unit as claimed in claim 14, comprising decelerating means, which act on said packages in each group along an end portion of said transfer path to slow down the packages prior to the pushing action of said movable member.

16. A unit as claimed in claim 14, wherein said conveying surface and said movable member are moved continuously along the respective said paths.

17. A unit for grouping packages along a transfer path, said unit comprising:
   an input station receiving said packages arranged in longitudinal lines parallel to said transfer path;
   an output station for groups comprising a given number of packages from respective said longitudinal lines and aligned in at least one line crosswise to said transfer path;
   a movable conveying surface, which is fed at predetermined time intervals with a number of packages equal to that of each group, and feeds said packages from said input station to said output station along said transfer path;
   at least one movable member, which is fed cyclically along an operating path having at least one portion parallel to said transfer path from said input station to said output station, and comprises an aligning surface, against which, at each cycle, the packages in each group upstream from the movable member come to rest and are aligned in at least one line crosswise to the transfer path;
   wherein said movable member also comprises a push surface which, at each cycle, acts on each group of packages downstream from the movable member to push said group out of said unit; and
   two guide side members located on opposite sides of said transfer path and converging towards said output station to compact said packages in each group crosswise to the transfer path.

18. A unit as claimed in claim 17, comprising decelerating means, which act on said packages in each group along an end portion of said transfer path to slow down the packages prior to the pushing action of said movable member.

19. A unit as claimed in claim 17, wherein said conveying surface and said movable member are moved continuously along the respective said paths.

* * * * *